(12) United States Patent
Kim et al.

(10) Patent No.: US 6,492,998 B1
(45) Date of Patent: Dec. 10, 2002

(54) CONTENTS-BASED VIDEO STORY BROWSING SYSTEM

(75) Inventors: Hyeon Jun Kim, Kyungki-do (KR); Jin Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/239,531

(22) Filed: Apr. 21, 1999

(30) Foreign Application Priority Data

Dec. 5, 1998 (KR) .............................. 98-53237
Dec. 5, 1998 (KR) .............................. 98-53238

(51) Int. Cl.[7] .................................................. G06F 3/00
(52) U.S. Cl. ....................... 345/723; 345/716; 345/719; 345/853; 345/854
(58) Field of Search ................................. 345/327, 328, 345/302, 356, 716, 723, 719, 853, 854, 730, 731, 732; 386/52, 55

(56) References Cited

U.S. PATENT DOCUMENTS

| | | | | |
|---|---|---|---|---|
| 5,537,528 A | * | 7/1996 | Takahashi | 707/512 |
| 5,737,552 A | * | 4/1998 | Lavallee et al. | 345/328 |
| 5,801,685 A | * | 9/1998 | Miller et al. | 345/302 |
| 5,956,026 A | * | 9/1999 | Ratakonda | 345/723 |
| 5,982,364 A | * | 11/1999 | Beckwith | 345/328 |
| 6,072,478 A | * | 6/2000 | Kurihara et al. | 345/302 |
| 6,118,450 A | * | 9/2000 | Proehl et al. | 345/349 |
| 6,154,213 A | * | 11/2000 | Rennison et al. | 345/356 |
| 6,278,447 B1 | * | 8/2001 | Anderson | 345/723 |

* cited by examiner

Primary Examiner—John Cabeca
Assistant Examiner—Kieu D. Vu
(74) Attorney, Agent, or Firm—Fleshner & Kim, LLP

(57) ABSTRACT

A content-based video story browsing system is disclosed including setting and representing relations between objects and places of the story. A content-based video story browsing system includes the steps of selecting objects and places as factors organizing contents of a video story and setting a relational graph relating the objects to corresponding places; setting a video story section and a representative scene as an events of contents development corresponding to the relations of the objects and the places; and displaying the video story section and the representative scene and its contents as browsing information corresponding to the relation selected from the relational graph.

34 Claims, 17 Drawing Sheets

CONTENTS-BASED VIDEO STORY BROWSING SYSTEM

BACKGROUND OF THE INVENTION

1. Field of the Invention

The present invention relates to a video story browsing system and more particularly to a contents-based video story browsing system defining and representing the relationship of significant factors in a video story. The factors includes an object, a place, and/or an event in time. The present invention also relates to a video story browser representing an overall outline consisting of paragraphs summarizing significant events for a convenient video story browsing.

2. Discussion of Related Art

Video browsers and video story summarization in the related art generally utilize key frames to represent a large a amount of story contents. Thus, it is difficult and/or complicated to summarize and browse the overall content of a movie or drama by extracted key frames or a character-based story browsing. Moreover, presenting contents of some scenes is ambiguous, making it difficult browse the exact information.

Although picture images of a drama or a movie progress by interconnection of events, key frame browsing or character-based browsing is simply performed without presenting any interconnected relations of events. A video story browsing technique has been proposed for summarizing and browsing the overall contents by extracting key frames from dynamic images and graphically showing the time relationship of each key frames. This technique may be usable for a simple video file, but is not suitable for video files of huge volume such as a drama or movie with numerous interconnected events over time. Moreover, because picture images of greater volume produce a large number of key frames, it is difficult to graphically represent key frames. Accordingly, it is hard for a user to understand the graphically represented information.

Another technique of key frame-based video story summarization and browsing has been proposed in which classes are formed according to a length of a section from which a key frame is extracted. Generally, a small number of key frames are extracted from sections of longer lengths for higher classes and a greater number of key frames are extracted from sections of smaller sections for lower classes, thereby forming a tree structure. However, this structure cannot be used comprehensively to browse the overall contents with representative scenes because the key frames are extracted from a too large section for the higher classes, making it difficult to retrieve a desired part using the key frames.

Still another object-based browsing technique has been proposed in which objects of dynamic images are organized and an attribute of each object in a section is displayed. However, this technique also makes it difficult to understand the overall contents. In addition, it is often difficult to determine which attribute should be designated for each object during a search algorithm.

Therefore, since video stories such as a drama or movie progress by changing characters and places in time, it would not only be impossible to summarize the contents, but would be difficult to browse the overall contents just by watching extracted characters or scenes.

SUMMARY OF THE INVENTION

Accordingly, an object of the present invention is to solve at least the problems and disadvantages of the related art.

An object of the present invention is to provide a content-based video story browsing system.

Another object of the present invention is to provide a video story browsing system summarizing the contents of a video story according to the relations of an object, a place, an event, and time.

Still another object of the present invention is to provide a content-based video story browsing system allowing a browsing by a relational graph reflecting a development of events in time with respect to a main object and place in a movie or drama.

A further object of the present invention is to provide a content-based video story browsing system allowing a browsing by sections of a movie or drama, each section describing events with respect to an object and a place in the section of the movie or drama.

Still a further object of the present invention is to provide a content-based video story browsing system allowing a browsing by relation of a main object and a place in which one relation is represented by a frame and description corresponding to the section of the story containing the relation.

Still a further object of the present invention is to provide a contents-based video story browsing system allowing browsing a video story based upon contents of a video story expressed by relations of a main object, a place, and an event, in which relations of plural objects and a place as well as the relations of one object and one place can be browsed.

Still a further object of the present invention is to provide a contents-based video story browsing system allowing summarization and browsing of a video story by displaying the contents of the video story in event paragraphs, in the form of a text or a text and representative scenes.

Additional. advantages, objects, and features of the invention will be set forth in part in the description which follows and in part will become apparent to those having ordinary skill in the art upon examination of the following or may he learned from practice of the invention. The objects and advantages of the invention may be realized and attained as particularly pointed out in the appended claims.

To achieve the objects and in accordance with the purposes of the invention, as embodied and broadly described herein, the present invention discloses a contents-based video story browsing system based upon relations of objects and places. The contents-based video story browsing system includes a scheme indicating a video story section and a representative scene as information for the development of the story events.

According to another embodiment of the present invention, a contents-based video story browsing system includes steps of selecting objects and places as factors organizing the contents of a video story and setting a relational graph relating the objects to corresponding places; setting a video story section and a representative scene as an event of contents development corresponding to the relations of the objects and the places; and displaying the video story section and the representative scene and its contents as the browsing information corresponding to the relation selected from the relational graph.

According to another embodiment of the present invention, a contents-based video story browsing system includes the steps of setting a relational graph of main objects and places as factors organizing contents of a video story, and adding an event description of text along with position information of sections corresponding to the relation and a representative frame position information representing each section; displaying an object-place relational graph of the video story; and if at least one relation is selected from the relational graph, displaying a representative frame of each section in the selected relation and an event description based upon the position information, and screening a user-desired section.

The contents-based video story browsing system further includes a step of setting the object-place relational graphs with respect to the overall video files and each video file, and schematically browsing the overall contents of several video files from the relational graphs with respect to the overall video files and browsing in detail each video file.

According two another embodiment of the present invention, the overall outline of a video story is divided by significant events and event paragraphs representing each events, and a scheme indicating a video story section corresponding to each event paragraph is set. If a certain event is selected, the information about the corresponding story section is displayed in response to the selection.

BRIEF DESCRIPTION OF THE ATTACHED DRAWINGS

The invention will be described in detail with reference to the following drawings in which like reference numerals refer to like elements wherein.

Figure 9:
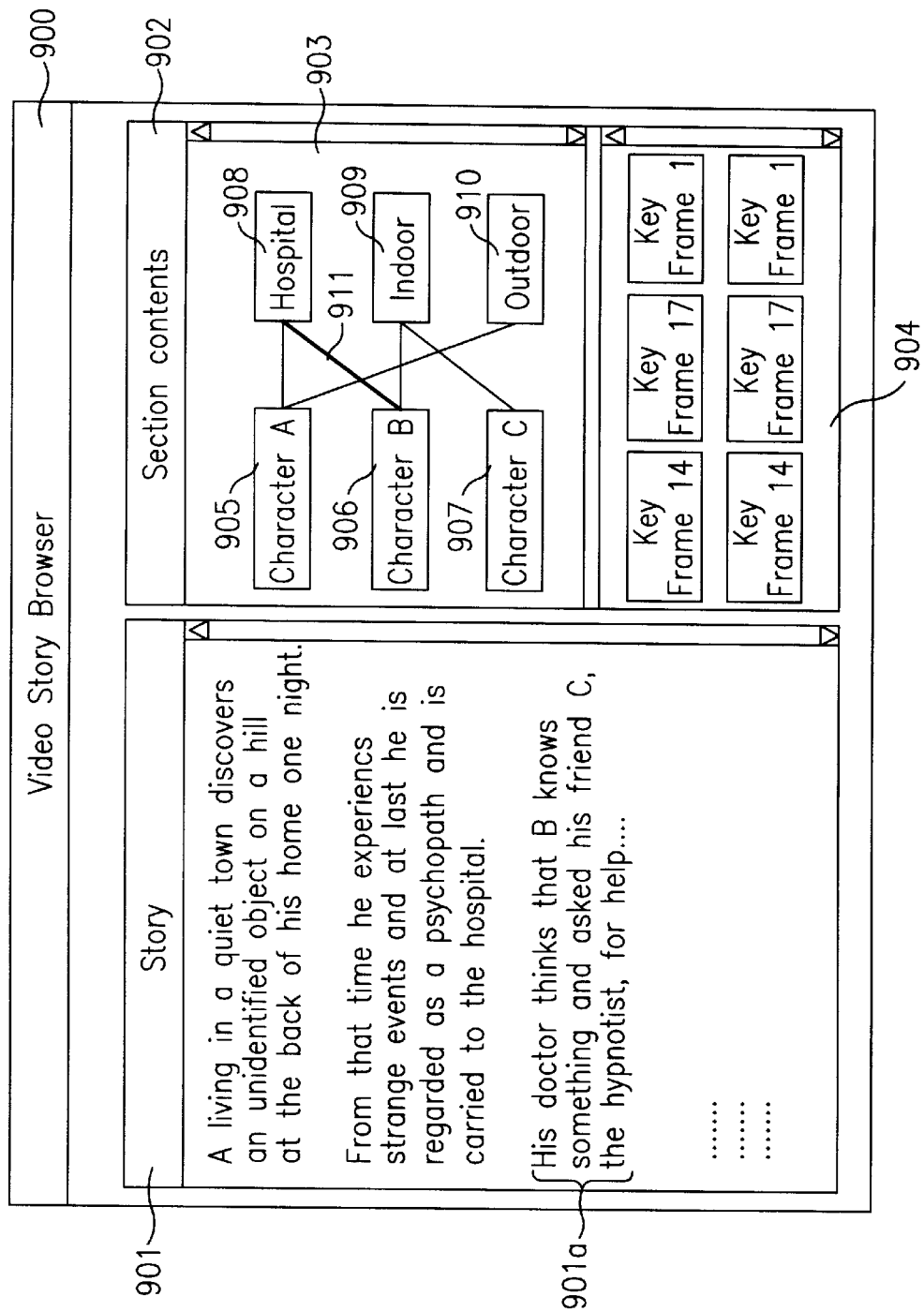
Figure 10:
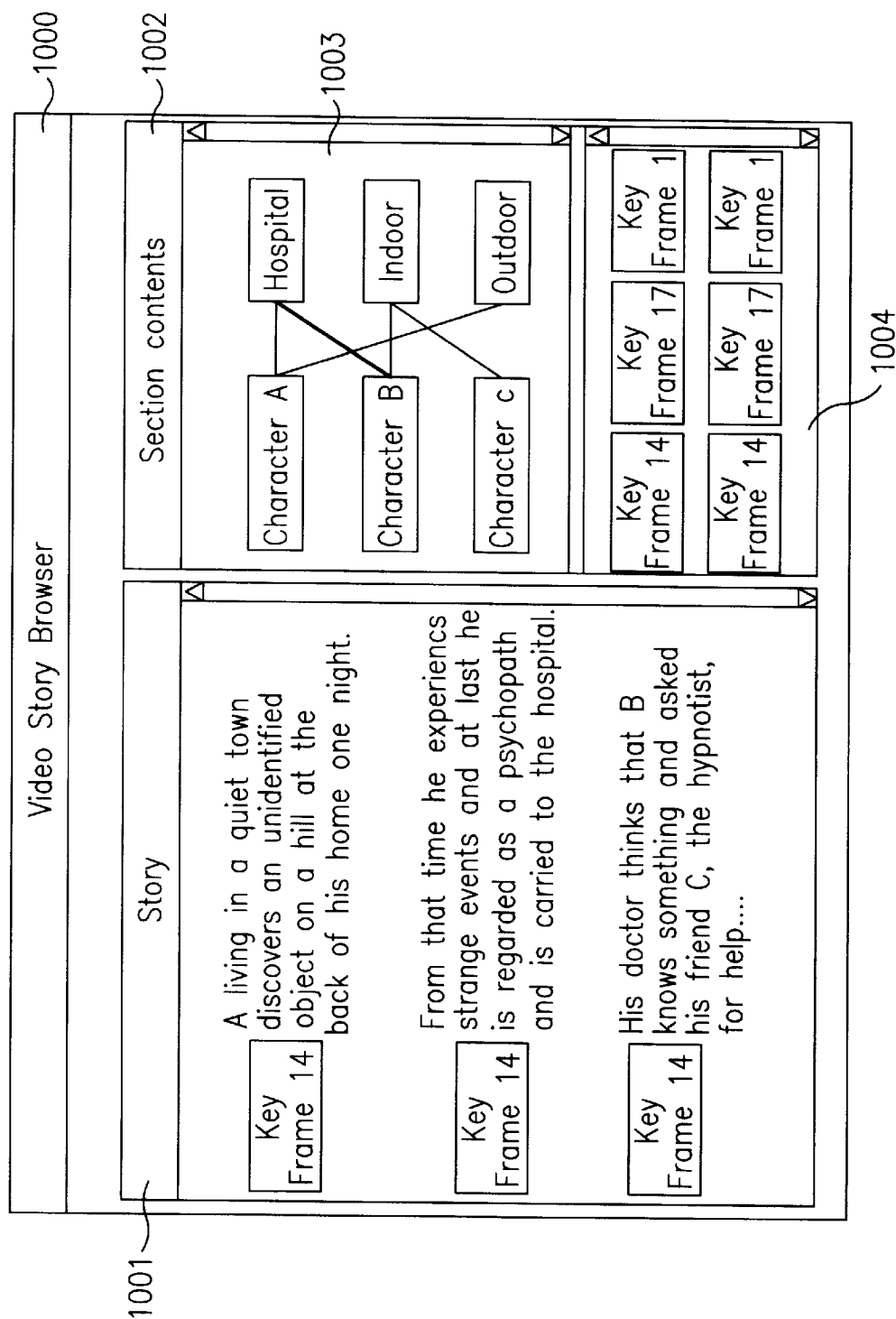
Figure 11:
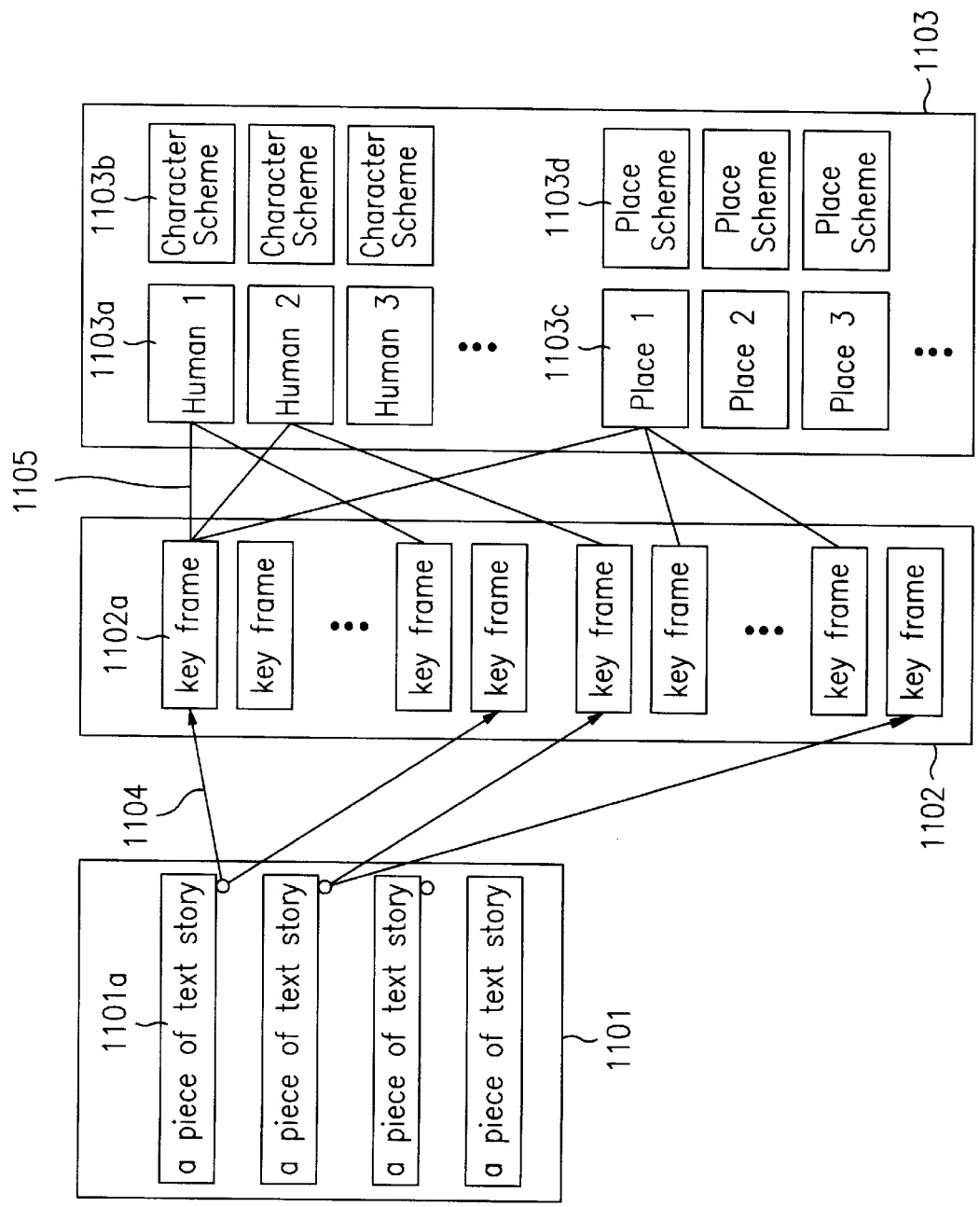
Figure 12:
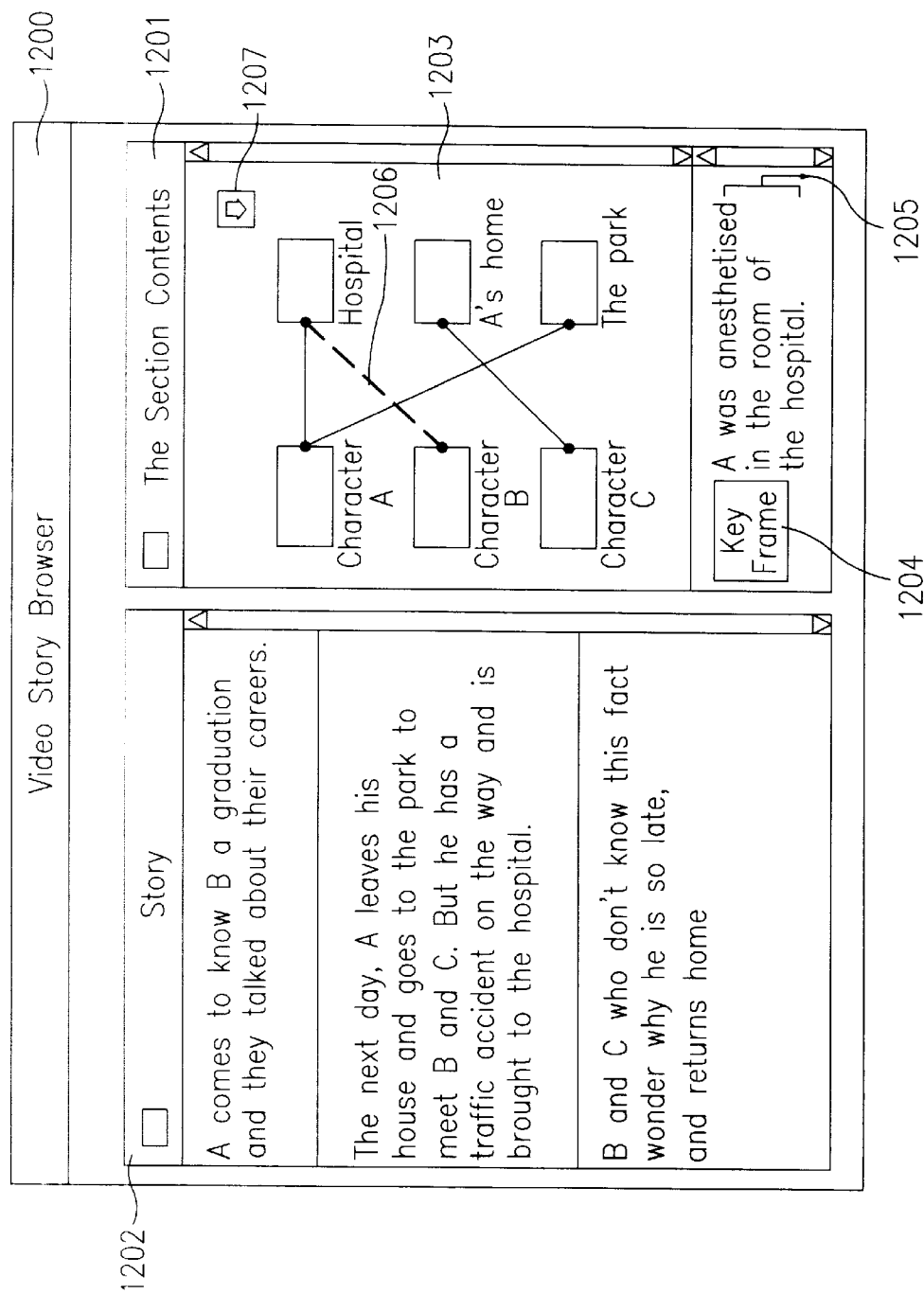
Figure 13:
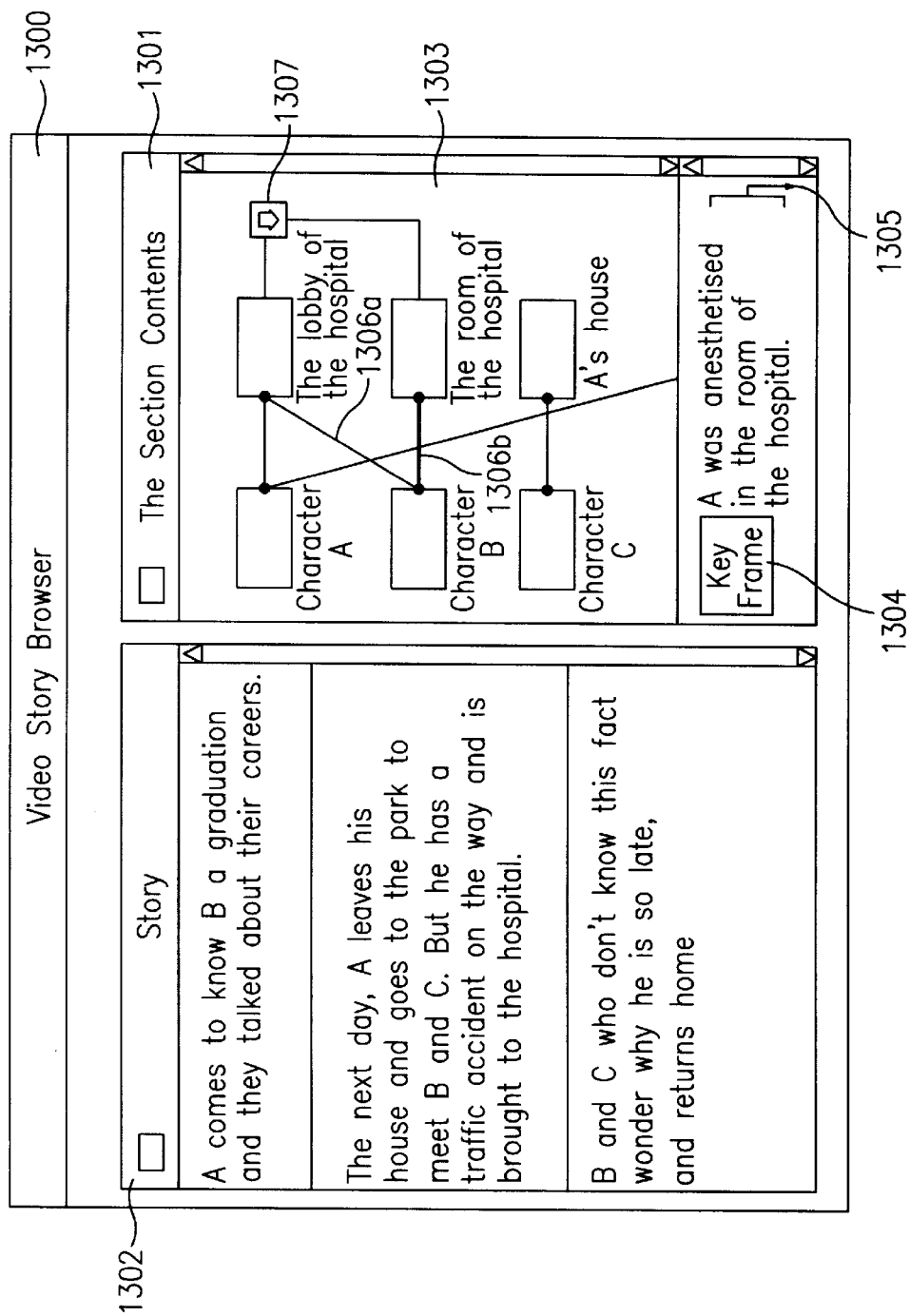

FIG. 9 is an example of a user interface representing a events in the overall story as a paragraph and presenting the relationship of characters and places related to the events, and presenting representative scenes according to the present invention;, FIG. 10 is an example of a user interface showing representative scenes by respective event paragraphs form the story according to the present invention;

FIG. 11 shows a structure of browsing information for embodying of FIGS. 9 and 10;

FIGS. 12 and 13 are each examples of a user interface showing events in the overall story as a paragraph and presenting the multiple level of characters and places related to the events; and FIGS. 14 to 16D illustrate example data structures for a content based browsing system according to the present invention.

DETAILED DESCRIPTION OF PREFERRED EMBODIMENT

Reference will now be made in detail to the preferred embodiments of the present invention, examples of which are illustrated in the accompanying drawings.

Figure 1:
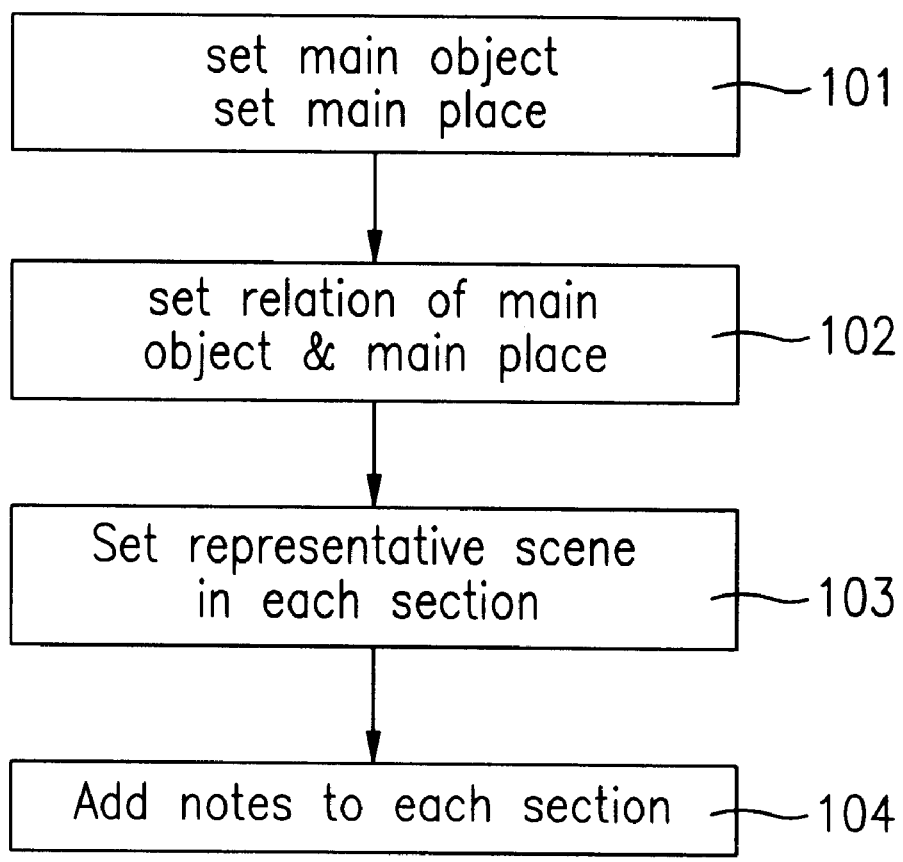
FIG. 1 is a flow chart showing the steps of forming the browsing information for browsing a story according to the present invention.

FIG. 1 is a flow chart for developing the database used in a video story browser. Generally, such a data is formed by setting a plurality of relations between objects and a places in a video story such as a movie or a drama. As shown in FIG. 1, characters and places necessary to develop events in a story are set as main objects and main places, respectively (step 101).

Subordinate classes to main objects and main places may also be defined. For example, if the main place is set to a "hospital," scenes may be subdivided as subordinate classes into a corridor, a ward, a surgery room, a lobby, and a hospital garden. However, if representing the main place simply as a "hospital" would better represent the overall outline of the video story, the subordinate classes are combined to form simply one main place, namely the "hospital."

After setting the main objects and main places, relationships of the main objects to the main places are set (step 102). For example, if character A, character B, and character C are set as the main objects; and if a hospital, an indoor, and an outdoor are set as the main place, the relations of the objects and places may be set as follows: places where character A appears are the hospitals and the indoor; places where character B appears are the indoor and the outdoor; and a place where character C appears is the outdoor.

The set relationships reflect the sections of the video story in which objects actually appear in the video story. Accordingly, the sections in which objects appear with respect to places are defined and indexed using the set relationships. A section may signify a frame in which an object actually appears or may signify an interval of frames in which an object generally appears. For example, characters A and B may alternately appear in a section where characters A and B are carrying on a conversation. Thus, neither characters A or B actually appears for the full duration of the frame interval. However, the frame interval would be indexed as a section in which either character A or B appears.

Thereafter, a representative scene for each indexed section are set (step 103). A frame of each section defined according to the relationships set in step 102 which best represents the corresponding section is set as the representative scene. The frame location of the representative scene is marked. In the example above, a frame showing an operation may be set as the representative scene of a section in which character A comes into the hospital with an illness, and the location of that frame would be marked.

Finally, the events are illustrated for each section by adding appropriate notes to corresponding sections (step 104). According to the above example, the operation frame is set as a representative scene for the relation of character A and the hospital, and notes which summarize the story contents of the section are added as text.

As described above, the relations of the main objects and main places are established based upon the contents of the video story. Moreover, the basic information of object, place, event, and time for a video story browsing is complete by indexing relevant sections, setting representative scenes in each section, and adding notes to each section. In the preferred embodiment, the developed information is stored in the header of a multimedia stream. However, the information may be stored in other locations. As a result, the video story browsing system allows users to perform a content-based browsing of a video story by reading the information stored in the header of the multimedia stream.

Figure 2:
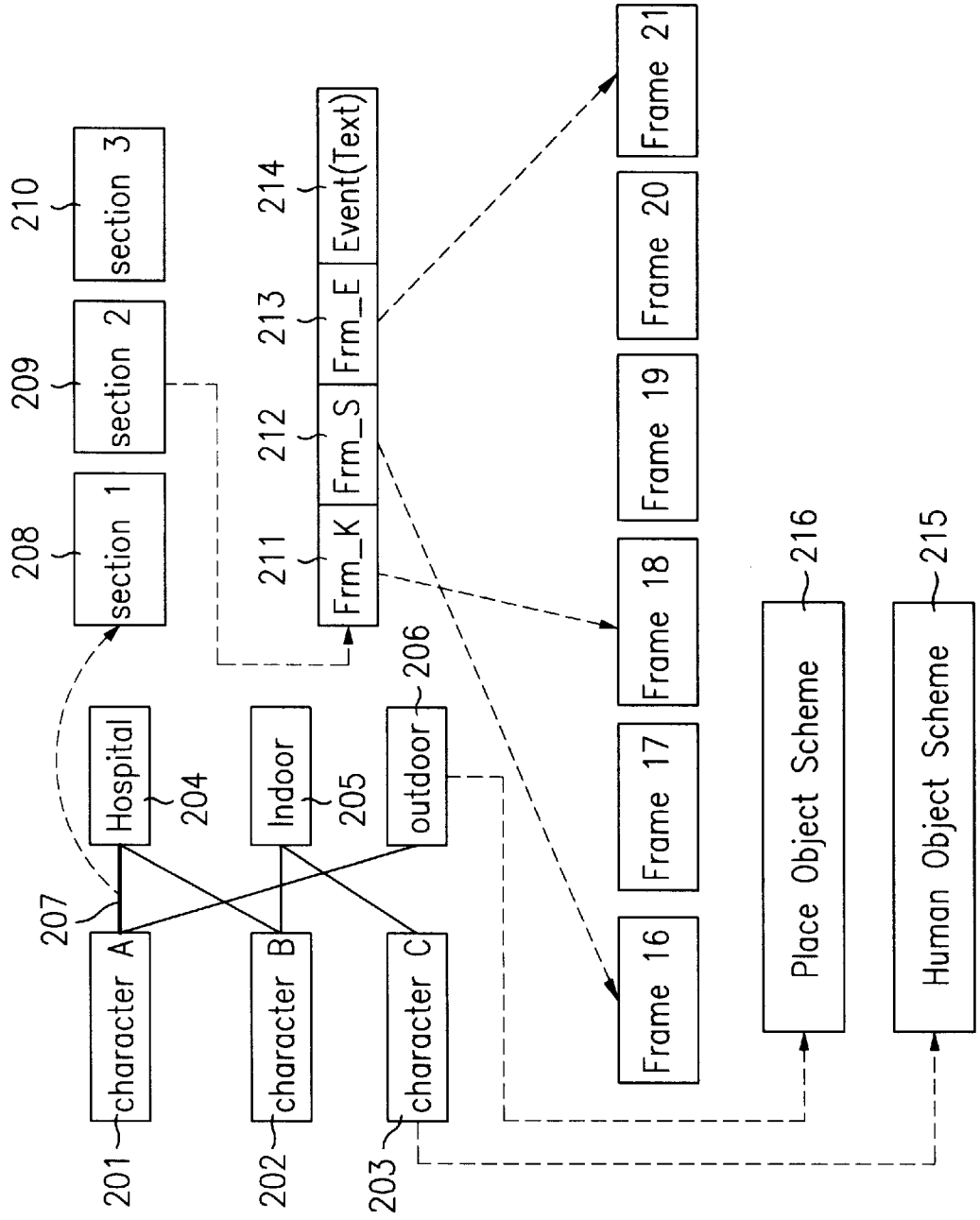
FIG. 2 is an example of a graphic data structure setting the relation of an object and a place according to the present invention.

FIG. 2 shows a graphical data structure of the relations between objects and a place/event developed by the steps described in reference to FIG. 1. Referring to FIG. 2, character A 201, character B 202, and character C 203 are set as the main objects; and a hospital 204, an indoor 205, and an outdoor 206 are set as the main places. Character A has relations to the hospital 204 and the outdoor 206, character B has relations to the hospital 204 and the indoor 205, and character C has a relation to the indoor 205. The relations of the objects 201 to 203 and places 204 to 206 are graphically shown by links such as the link 207.

The sections in which each character appears are indexed according to the object-place relations. As shown in FIG. 2, three sections 1 to 3 (208, 209 and 210) in which character A appears in the hospital 204 would correspond to the relation between character A and the hospital 204. A scene representing each of the three sections, the start and the end positions of the section, and the event illustration of each section are also illustrated.

Particularly, in section 2 (209) character A appears from frame 16 to frame 21. Accordingly, frame 18 becomes a key frame 211 as the representative scene and its position information Frm_K is recorded. The frame 16 is a start frame 212 of section 2 (209) and its position information Frm_S is recorded, and the frame 21 becomes an end frame 213 of section 2 (209) and its position information Frm_E is recorded. A summary of the story contents or event for section 2 (209) is stored as text Event(text) 214.

A human object scheme 215 which is a lower class subordinate to a main object may be defined for the main objects 201 to 203, and a place object scheme 216 which is a the lower class subordinate to a main place may be defined for the main places 204 to 206. Namely, the place object scheme 216 may define a ward, a corridor, a lobby, a surgery room, etc. as the lower class places of the hospital 204 and object-place relations would be set according to the defined lower class places rather than the hospital 204.

The graphic structure shown in FIG. 2 is only a portion of the object-place/event relations. In an actual structure, there may be any number of sections with respect to the relation of one object and one place; there may be any number of objects having relations to one place; and there may be any number of places having relations to one object. To represent a scene without any objects, the structure may represent a place having a relation with a null object. There also may be a multiple object-place relation as well as the single object-place relation.

Figure 3:
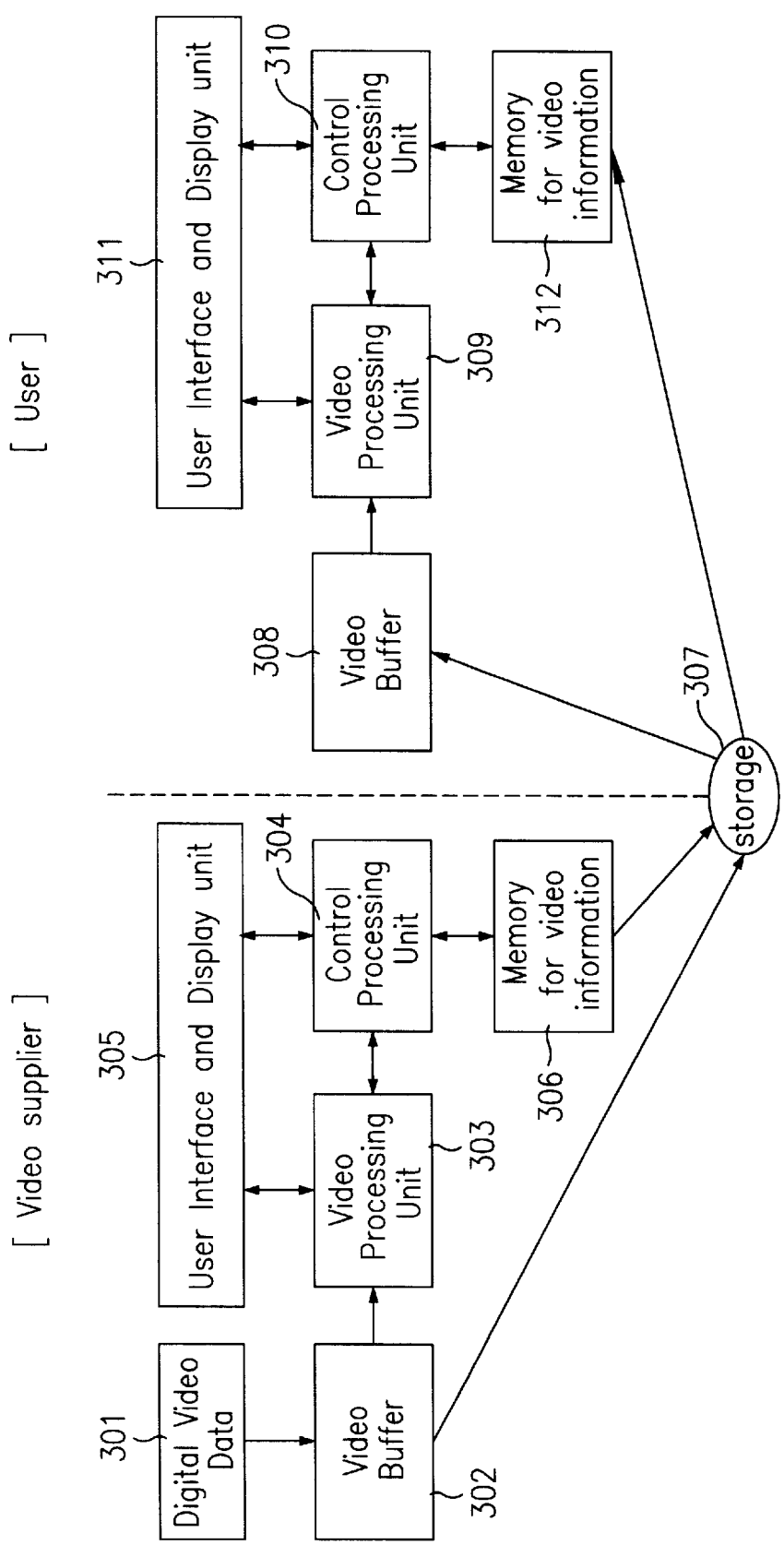
FIG. 3 is a block diagram for a video story production and a video story browser according to present invention.

FIG. 3 shows a first embodiment of a video story browsing system implementing the database discussed in reference to FIGS. 1 and 2. To facilitate the explanation of the system, the system for the video supplier and the system for the user have been separately illustrated. The video supplier develops a browsing schemes such as shown in FIG. 2 by the steps in FIG. 1, and the user may browse a video story based upon the browsing schemes.

Particularly, digital video data 301 is temporarily stored in a video buffer 302, and a video processing unit 303 controls the digital video data 301 stored in the video buffer 302 as a multimedia video stream file. A control processing unit 304 produces or reads the necessary information from the digital video data 301. A user interface and display unit 305 displays the video data processed by the video processing unit 303 and the control processing unit 304, and provides an interface to receive an input from a user for production of a browsing scheme.

A browsing scheme such as the object-place/event relation schemes of FIG. 2 is processed by the control processing unit 304 and temporarily stored in a memory for video information 306. The processed schemes are then stored in a storage 307 in a proper format along with the video data stored in the video buffer 302. The video data stored in the storage 307 and the browsing schemes are provided to the user through a recording media, a wire-broadcasting, or a radio-broadcasting network.

A user browses and views the video data and object-place/event data stored in the storage 307. A video buffer 308 temporarily reads and stores the video data from the storage 307. A video processing unit 309 and a control processing unit 310 processes the video data stored in the video buffer 308. Particularly, a memory for video information 312 reads and temporarily stores the object-place/event data from the storage 307. The control processing unit 310 processes the information from the memory for video information. Subsequently, the processed video data and information are displayed according the browsing selections received through a user interface and display unit 311.

Therefore, in the content-based video story browsing system of FIG. 3, the procedure illustrated in FIG. 1 and the resulting data structure of FIG. 2 are completely organized through a user interface and display unit 305 by the supplier. The database is stored in an appropriate storage 307 along with the video data. A user may then perform video story browsing through a user interface and display unit 311.

Figure 4:
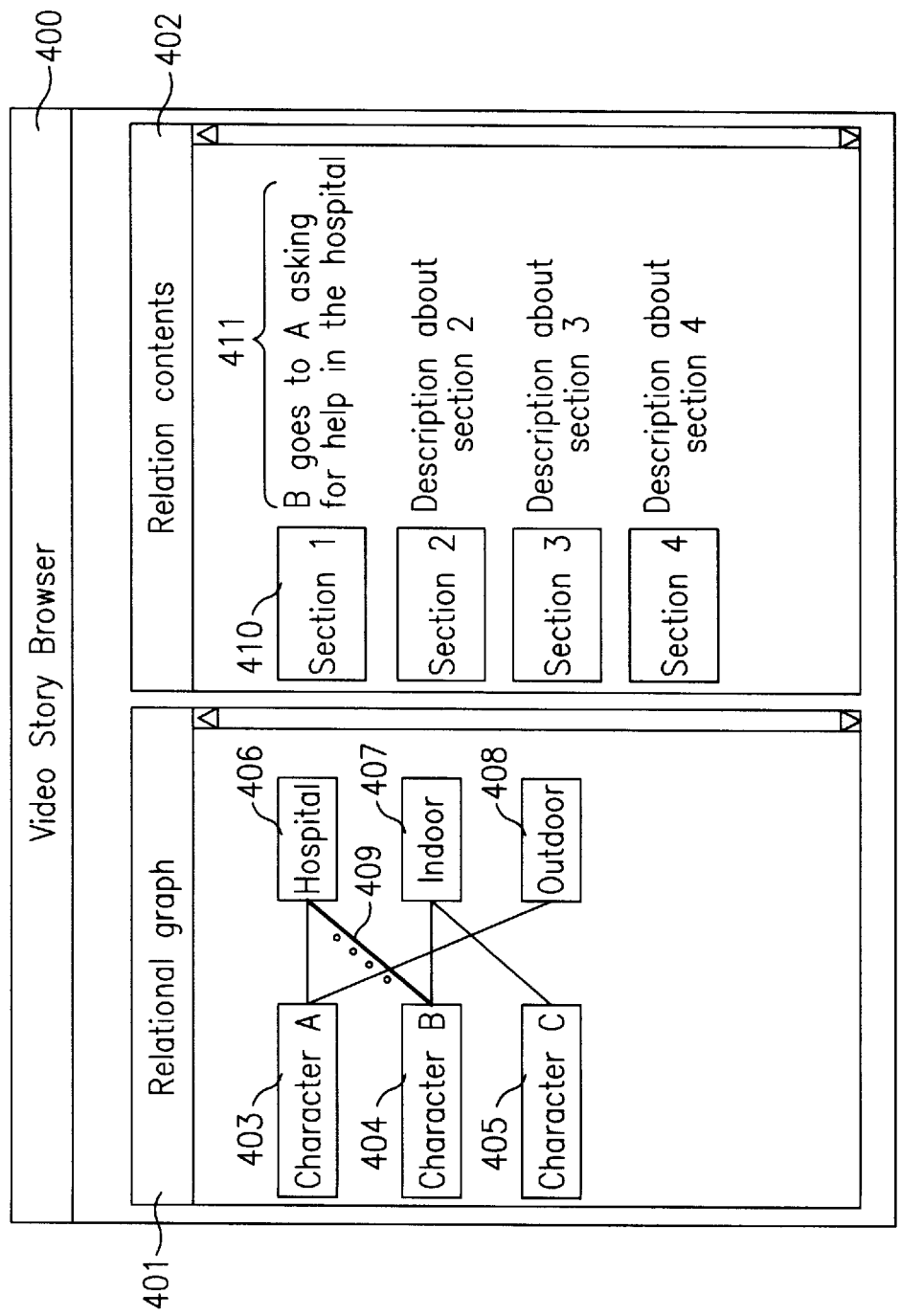
FIG. 4 is an example of a user interface with a graphic data structure setting the relation of an object and a place according to the present invention.

FIG. 4 shows an example of a user interface for the user of the video story browser according to the present invention. The user interface corresponds to the relations of object-place/event of FIG. 2. The video story browser 400 displays an object-place relational graph 401 and relation contents 402 illustrating the story contents of sections corresponding to a selected relation. The object-place relations developed are as follows: character A 403 has a relation to a hospital 406 and an outdoor 408; character B 404 has a relation to the hospital 406 and an indoor 407; and character C 405 has a relation to the indoor 4071.

While browsing, it a user selects the relation between character B and the hospital 406 by selecting a link 409 or by directly selecting the character B and the hospital 406 through the user interface and display unit 311, the control processing unit 310 processes to display the four sections 1 to 4 (410) and events 411 corresponding to the above relation, by referring to the memory 312. The four sections 1 to 4 (410) are the representative scenes selected from corresponding sections. Also, the notation "oooo" over the link 409 indicates the four existing sections in the relation between character B and the hospital 406. However, the number of sections need not be indicated, but if indicated, any other method may be used.

The user may select objects or a place rather than a relational link 409. If at least one object is selected from the relational graph, sections with the object(s) can be browsed and displayed regardless of the places. Likewise, if a certain place is selected, sections with that place can be browsed regardless of the objects.

Figure 5:
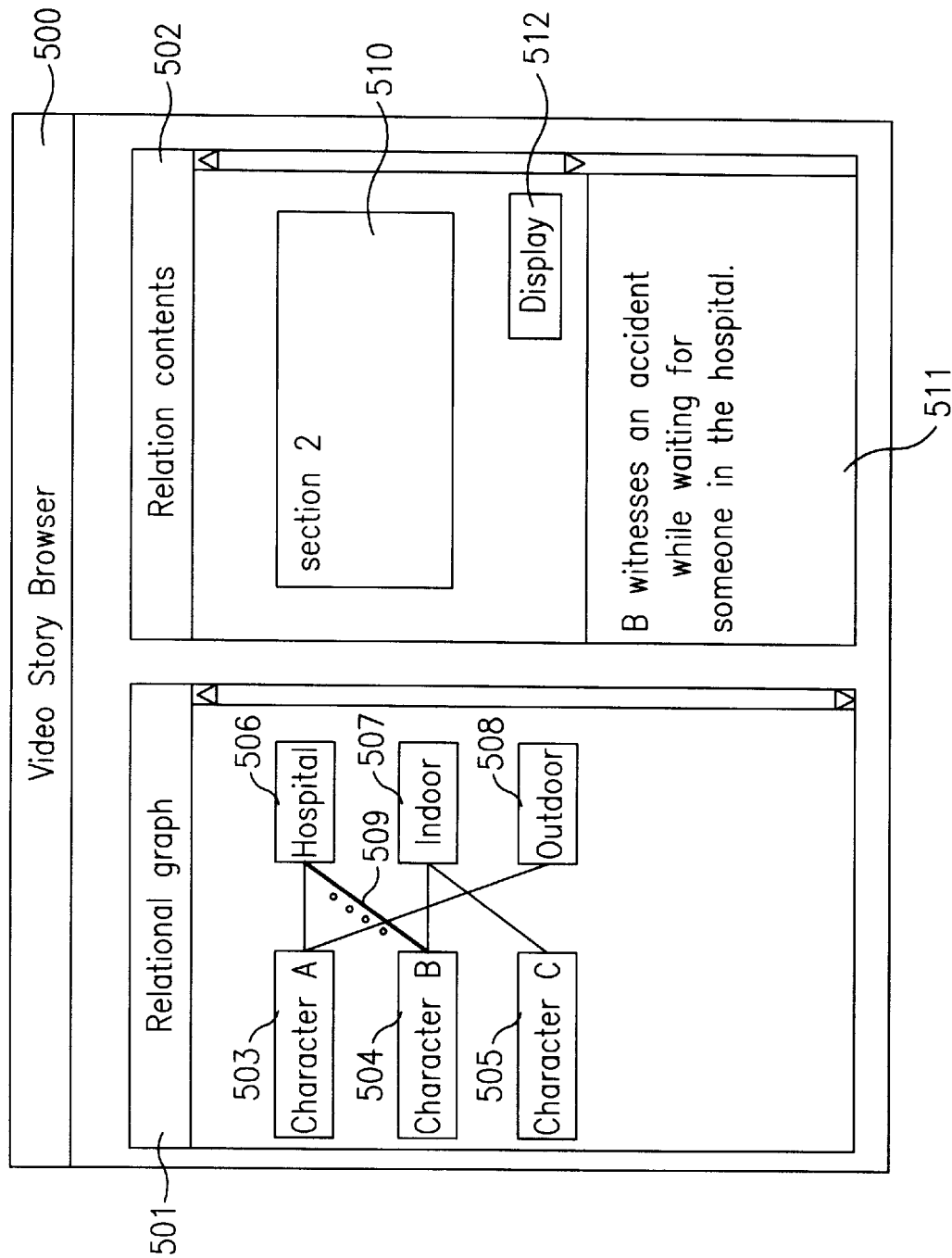
FIG. 5 is another example of a user interface with a graphic data structure setting the relation of an object and a place according to the present invention.

FIG. 5 is an example of the user interface when one of the sections from sections 1 to 4 (410) corresponding to the object-place relation (409) in FIG. 4 is selected by selecting the representative scene corresponding to section 2 (510). Thus, if a user selects the relationship between character B 504 and the hospital 506, and then selects section 2 (510), a more detailed description 511 of section 2 (510) and the representative scene are displayed to the user in the relation contents 502.

The video story browser 500 still displays an object-place relational graph 501 with the data structure of the characters 503 to 505, the places 506 to 508, and the selected link 509. The user may reproduce a portion of the video data corresponding to section 2 (510) through an icon 512. In response, the start frame to the end frame of the corresponding section are displayed.

Figure 6:
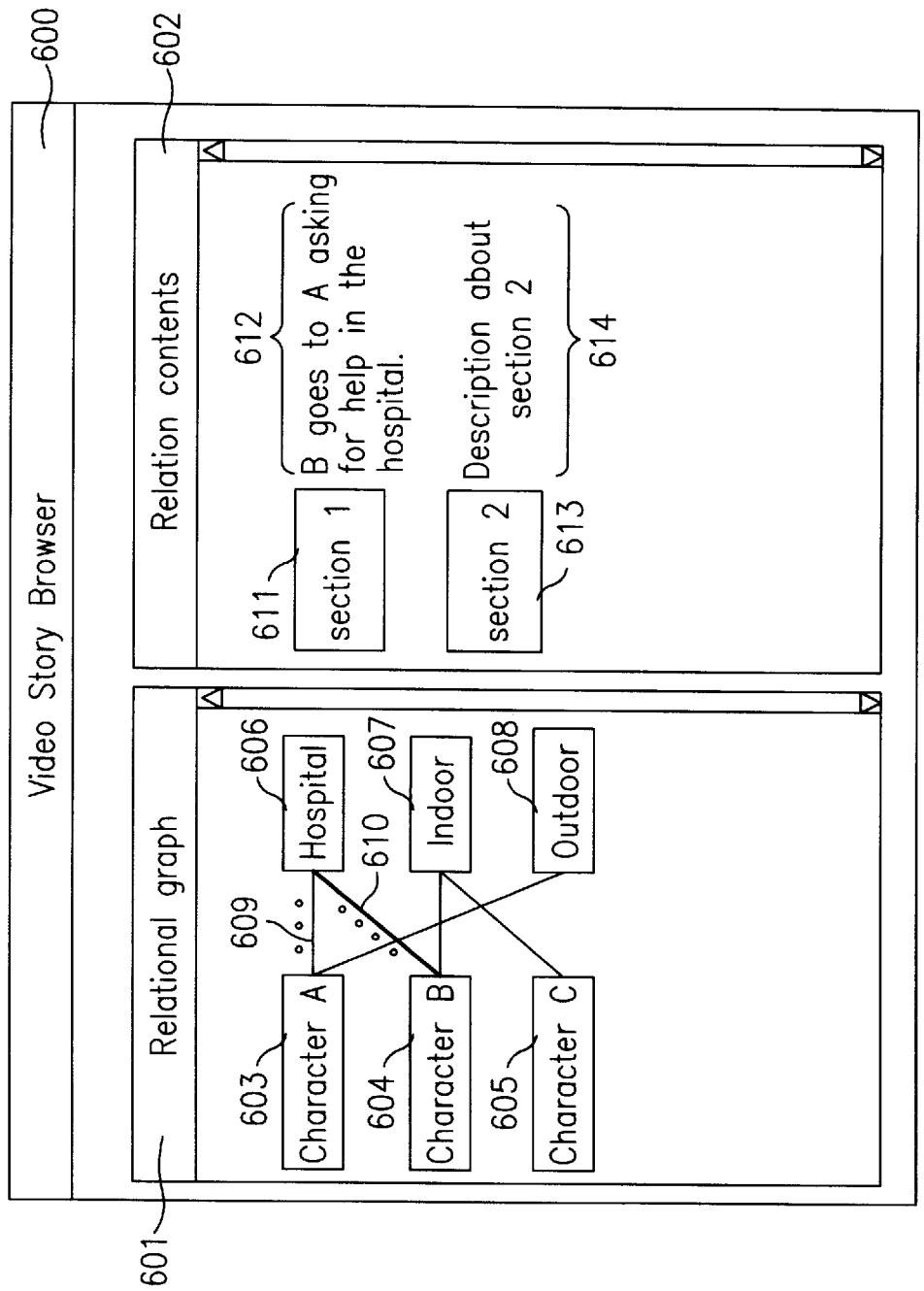
FIG. 6 is an example of a user interface when several objects and places are selected in a graphic data structure setting the relation of an object and a place according to the present invention.

FIG. 6 is an example of a user interface when more than one object and a place are selected from the relational graph. The video story browser 600 displays an object-place relational graph 601 and relation contents 602. The relational graph 601 includes a data structure of characters 603 to 605, the places 606 to 608, and links 609 and 610. If characters A and B and a place 606 are selected, representative scenes 611 and 613 with illustrations 612 and 614 are displayed. The representative scenes 611 and 613 correspond with sections in which character A and character B simultaneously appears in the hospital 606.

As discussed above, if plural objects are selected without selecting a place, the video story browser 600 displays sections in which the selected objects appear regardless of the places. Thus, the user may view the places in which each selected object appears. Similarly, if one place is selected without selecting an object, the video story browser 600 displays the sections in which the selected place appears regardless of objects.

Figure 7:
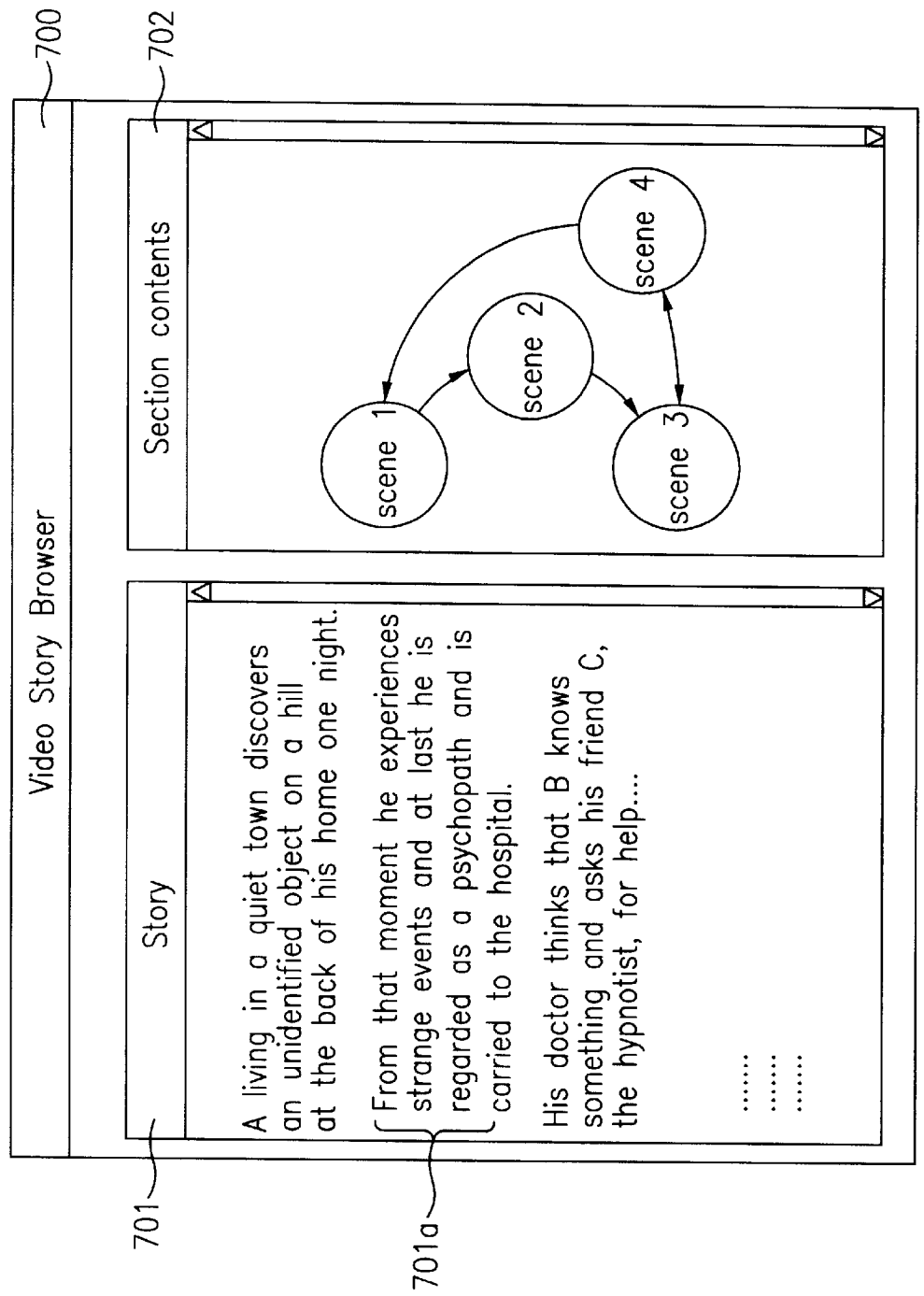
FIG. 7 is an example of a user interface representing an events in the overall story as a paragraph and representing key frames and their time relations according to the present invention.

FIG. 7 shows an example of a user interface representing the events of a story by paragraphs and representing the relations of the events, including relations in time, by graph in key frames. The video story browser 700 has a story display 701 with event paragraphs 701a and when one event paragraph is selected, the section contents 702 shows a transition graph linking scenes 1 to 4 of the section corresponding to the selected event.

Figure 8:
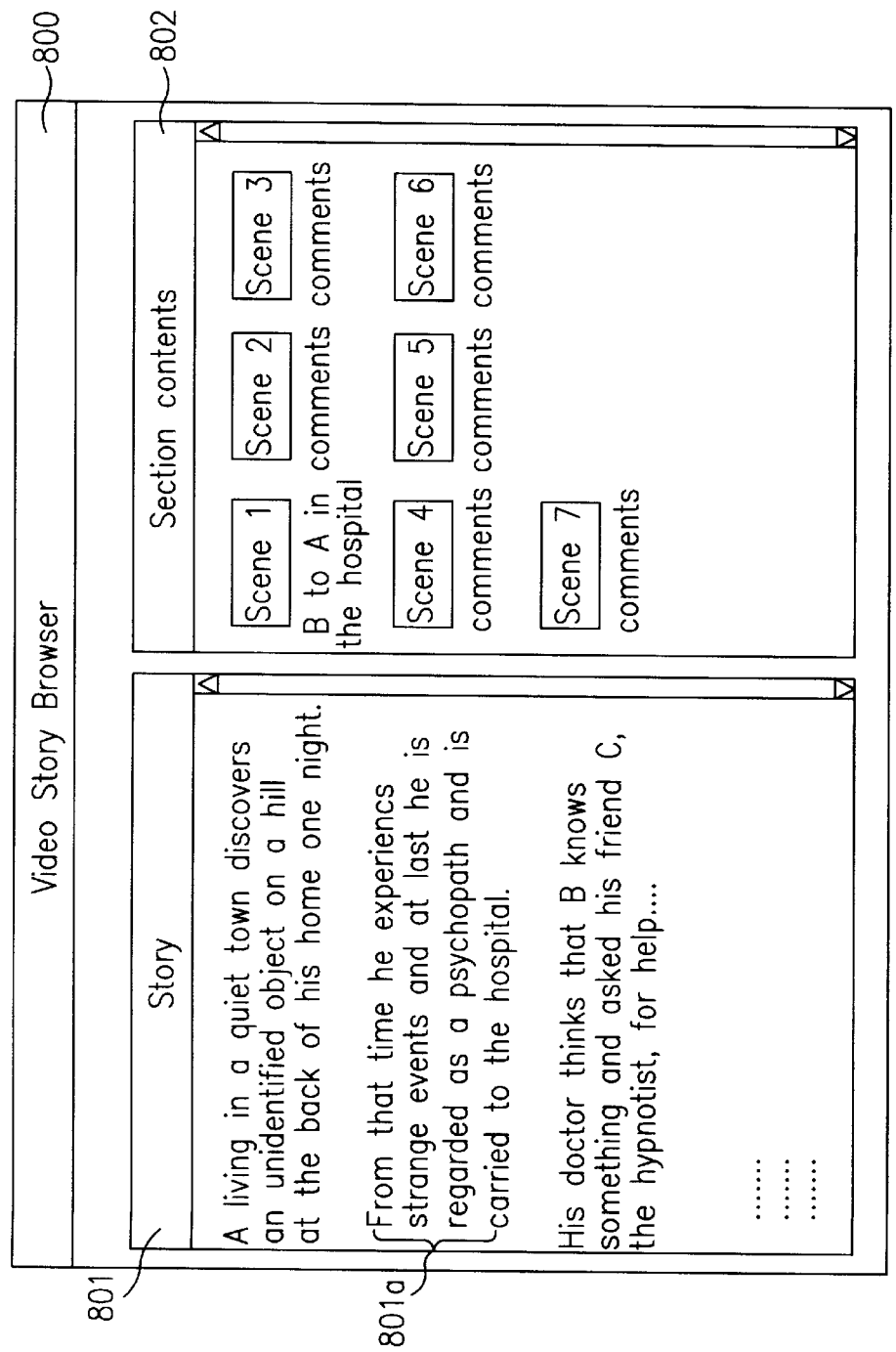
FIG. 8 is an example of a user interface representing a events in the overall story as a paragraph and presenting a scene representing the events as a key frame according to the present invention.

FIG. 8 is an example of a user interface representing events of the story by paragraphs and presenting scenes representing the events in the key frames. The video story browser 800 has a story display 801 with event paragraphs 801a and when one event paragraph is selected, the section contents 802 shows scenes 1 to 7 of the section corresponding to the selected event with brief description for each scene.

FIG. 9 is an example of a user interface representing events of the story by paragraphs and presenting the relations between the characters and places as well as representative scenes of the corresponding event of the story. The video story browser 900 has a story display 901 representing event paragraphs 901a and when on event paragraph is selected, the section contents 902 shows representative scenes for a character-place relational graph of a section corresponding to the selected event.

A character-place relational graph screen 903 and a representative scene screen 904 for a certain relation are displayed in section contents 902. When one event paragraph 901a corresponding to a certain event is selected in the story display 901, the relations of characters A, B and C (905 to 907) appearing in section corresponding to the selected event and places such as a hospital 908, an indoor 909, and outdoor 910, are displayed in the character-place relational graph screen 903. If one relation 911 between character B and the hospital 908 is selected, representative scenes of a section in which character B appears in the hospital 908 are displayed 20 in the representative scene screen 904.

FIG. 10 is an example of a user interface showing representative scenes for the respective event paragraphs of the story. The video story browser 100(0 has a story display 1001 representing key frames 14 (or representative scenes) and paragraphs corresponding to the events and when one event paragraph is selected, the section contents 902 show representative scenes for a character-place relational graph of a section corresponding to the selected event. A character-place relational graph screen 1003 and a representative scene screen 1004 of a certain relation are displayed in the section contents 1002.

The browsing method and results displayed in the section contents 1002 are the same as described in reference to FIG. 9. However, in FIG. 10, a representative key frame 14 representing an event may be selected rather than an event paragraph to display the character-place relation and the representative scenes corresponding to the selected key frame 14.

FIG. 11 is another example of a user interface representing a character-place relational graph according to the present invention. Reference numeral 1101 denotes the overall story consisting of event paragraphs 1101a. Reference numeral 1102 denotes scenes representing an event section by key frames (or position information) 1102a and links 1104 to the event paragraphs of the story section.

Reference numeral 1103 denotes a graphic structure of the relations between characters (1103a, 1103b) and places (1103c, 1103d) in each section corresponding to the event paragraphs 1101a. Character schemes 1103b subordinate to character 1103a are defined as the lower class relational schemes to the places 1103c. For example, a 'ward', a 'surgery room', and a 'hospital corridor' may be subordinate to the 'hospital'.

FIGS. 12 and 13 are each examples of a user interface showing events of a story by paragraphs and presenting the multiple level of characters and places related to the events. As shown in FIG. 12, the video story browser 1200 has an object-place relational display 1201 and a story display 1202 representing event paragraphs. The object-place relational display 1201 includes a screen 1203 graphically representing the relations of objects and places, a representative key frame 1204 corresponding to a selected relation, and a description 1205 of the event in the section.

A representative scene (key frame) representing the event, as in FIG. 10, may be displayed in the story display 1202. In FIG. 12, three characters A, B and C are set as the objects, and a hospital, a character A's house, a park are set as the places. Particularly, character A has a relation to the 'hospital' and the 'park', and character B has a relation to the 'hospital', and character C has a relation to character A's home.

When a relation 1206 between character B and the 'hospital' is selected, a representative scene of a section in which character B appears in the 'hospital' is displayed as a key frame 1204 with a description 1205 about the section. A display-zoom button 1207 indicates that there is a lower class level subordinate to the selected place, namely the 'hospital'. The display-zoom button 1207 may be provided in a menu, rather than being displayed in the section contents 1201. If a user selects the display-zoom button 1207, an object-place relation of a level subordinate to 'hospital' would be displayed, as shown in FIG. 13.

Referring to FIG. 13, the video story browser 1300 has a section contents screen 1301 and a story display 1302. The section contents screen 1301 includes an object-place relational graph 1303, a key frame 1304 corresponding to the selected relation, and a description 1305 of the event in the section. The lower class places defined for the 'hospital' are the lobby of the hospital and a ward of the hospital. Character B has relations 1306a and 1306b to both the lower class places.

Therefore, a user may select the relation 1306a between character B arid The lobby or relation 1306b between character B and the ward from a video story browser 1300 of FIG. 13. In response, a key frame 1304 and its description 1305 corresponding to the selected relation would be displayed. If the button 1307 grouping the lobby and the ward is selected, the screen returns to the upper level relational graph as shown in FIG. 12.

As described above in reference to FIGS. 1 to 13, the present invention is capable of browsing a video story by the relations of object-place. FIGS. 1 to 13 concern a single video file, a single drama or a single movie.

The present invention employs the concept of the content-based video story browsing system. The plural video files are represented via a single relational graph, and the contents of each video file are represented via a single relational graph. The contents can be briefly browsed from the relational graph, and a detail browsing may be performed from the relational graph for the contents of one video file. If a movie is divided into several video files, different events develop with the same objects (e.g. the same hero or heroin) and same places (the main places of the development of the video story). The divided video files are considered as a single video file, and its contents are illustrated by the object-place relational graph as shown in FIGS. 1 to 13. Thus, a user may schematically browse the overall contents of the several video files of a single movie.

Figure 14:
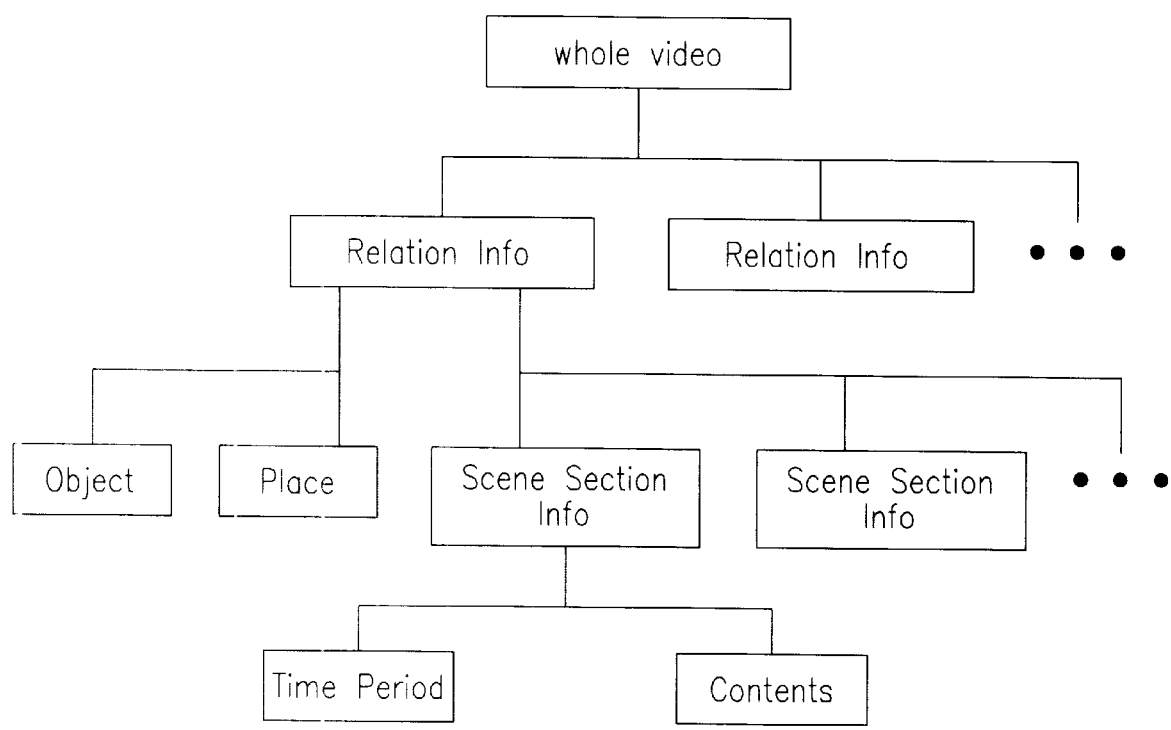
Figure 15:
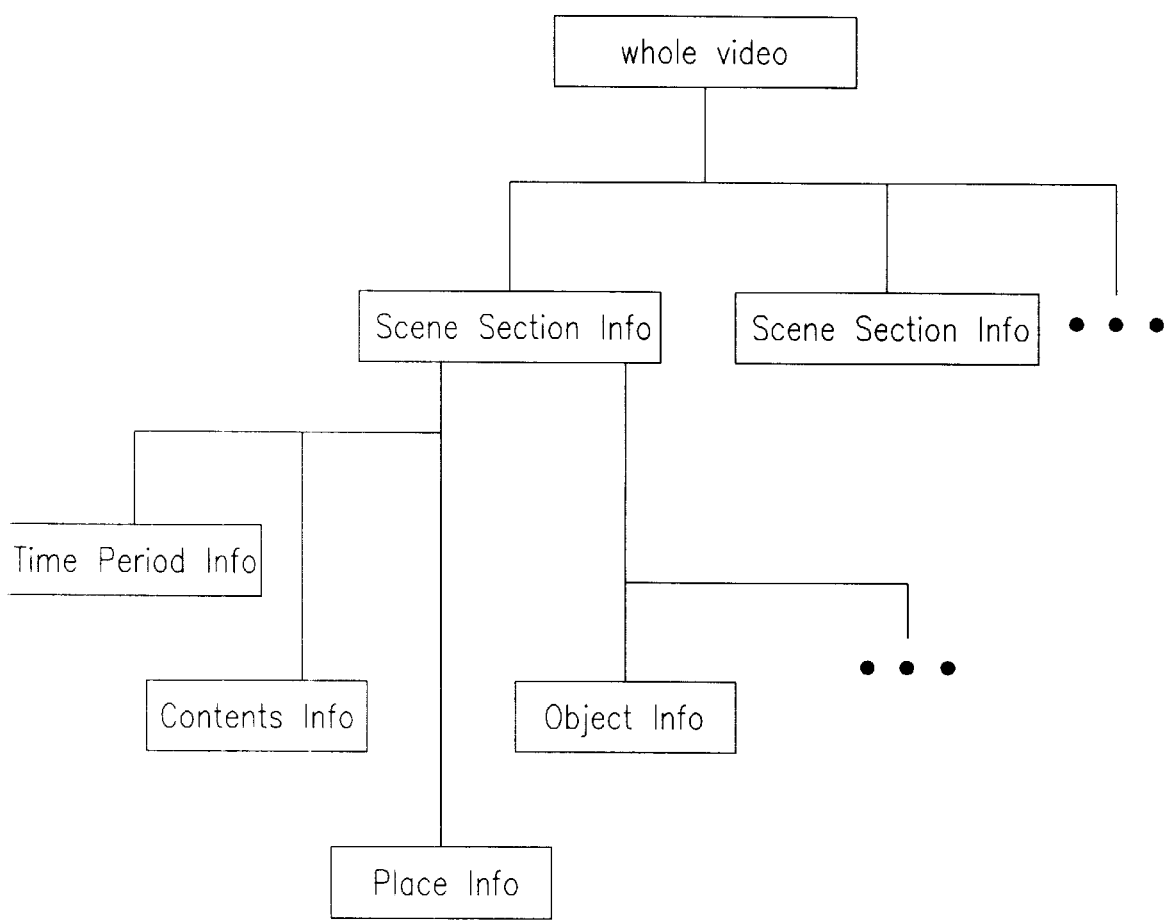

FIG. 14 shows an example of the data structure for a story browser according to the present invention. As shown, a video is divided relation information which includes object and place relation information and scene section information. Each scene section information includes time period and contents of the section in the story. FIG. 15 shows another example of the data structure for a story browser according to the present invention. The video is divided into scene section information rather than the relation information. Each scene section information includes a time period information, contents information, and place information as well a plurality of object information.

Figure 16A:
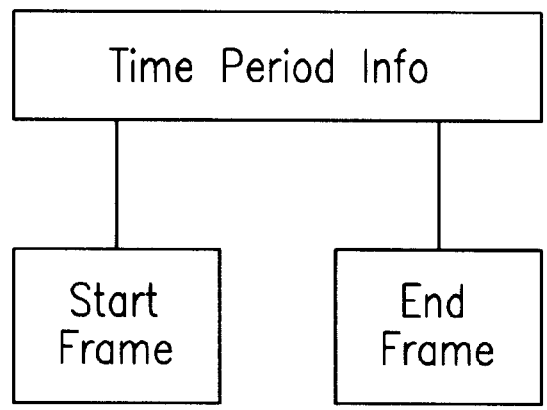
Figure 16B:
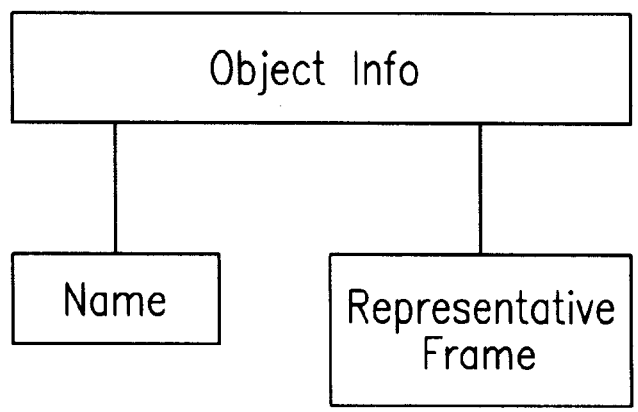
Figure 16C:
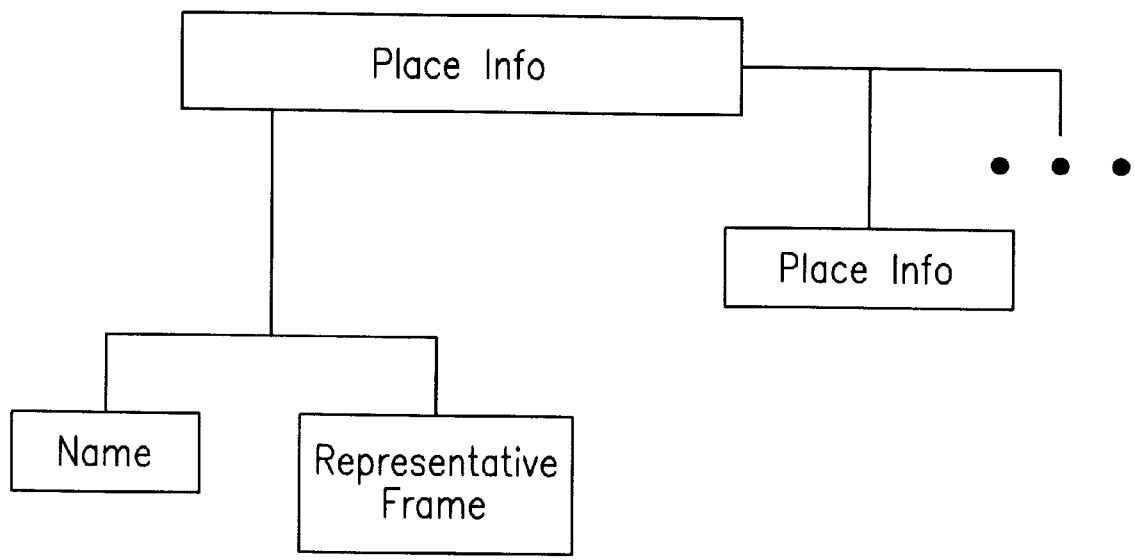
Figure 16D:
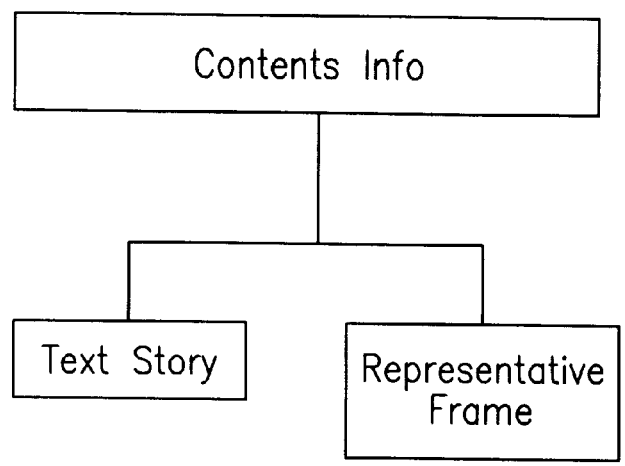

FIGS. 16A to 16D shows the data structures for the time period, object, place and contents information in FIGS. 14 and 15. Particularly, the time period information includes the start frame and the end frame of a section, as shown in FIG. 16A. The object information includes name and a representative frame, as shown in FIG. 16B. The place information includes the name and representative frame, and may optionally include lower class places, as shown in FIG. 16C. The contents information includes the text story and the representative frame, as shown in FIG. 16D.

According to the present invention, the overall contents of a video story are summarized and a certain position in the summary may be selected to browse the detailed contents corresponding to that position. In addition, since the present invention develops the relational graph based upon the basic factors, namely the characters and backgrounds, necessary for the development of an event, a user can easily understand the contents.

Moreover, this invention may be applicable to a video story of animals set as the main objects rather than persons. Also, the level of places may be varied with the development of the story. Thus, the present invention allows to easily summarize the contents of the story with development of an event since a lower class of an object or place subordinate to the main object and place may be defined.

In addition, the present invention sets the relationship of objects, places, and time from the according to the development of an event, and various modifications are available. For example, for a video story of sports, e.g. golf, the main object may be set as a golfer, and the main place may set as a group of a teeing ground, a fairway, etc. Since the event of each scene may be related to the kinds of the golfer's swings the present invention may be effectively implemented in sports broadcasting.

Furthermore, the present invention include a data structure in which the contents of several video files are represented via a single relational graph, and another data structure in which the contents of each video file are represented via a single relational graph, such that a user may schematically browse the overall contents of the several video files from the relational graph and browse in detail the contents of a single video file from the corresponding relational graph, thus assuring a package browsing of the several video files.

According to the present invention, the overall story of a drama or movie is illustrated by a collection events in the drama or movie, thus removing the shortcomings of the conventional key frame-based contents summarization and browsing method which describes the development of a video story only with representative scenes. Because the overall story of a drama or movie is represented by event paragraphs, the present invention removes the complexity and the difficulty of expressing the overall contents of large scale solely by key frames or other conventional browsing method, thus ensuring easy and simple summarization and browsing of a video story.

The foregoing embodiments arc merely exemplary and are not to be construed as limiting the present invention. The present teachings can be readily applied to other types of apparatuses The description of the present invention is intended to be illustrative, and not to limit the scope of the claims. Many alternatives, modifications, and variations will be apparent to those skilled in the art.

What is claimed is:

1. A content-based video story browsing system comprising:
   a memory storing a video story and browsing data based upon relations between at least two objects and at least two places of the video story; and
   a user interface displaying the browsing data, receiving user selections based upon the displayed browsing data, and displaying a section of the video story corresponding to the user selections, wherein the displayed browsing data comprises:
   a relational graph screen graphically showing the relations between at least two objects and at least two places of the video story, wherein any of said objects can be selected with any of said places.

2. The system of claim 1, wherein the displayed browsing data further comprises:
   a relation contents screen showing at least one representative scene and brief description of a section in the video story corresponding to a selected relation from the relational graph screen.

3. A system of claim 2, wherein the relation contents screen of the user interface shows only one representative scene, a display button, and detailed description of a section in the video story corresponding to said one representative scene when one representative scene is selected from said ay least one representative scene; and wherein the relation contents screen displays the section in the video story corresponding to said one representative scene when the display button is selected.

4. A display of content-based video story browsing system of claim 2, wherein links between the at least one object and the at least one place are user selectable to correspondingly update the at least one representative scene and the brief description.

5. The system of claim 1, wherein the displayed browsing data further comprises:
   a relation contents screen showing at least one representative scene and brief description of a section in the video story corresponding to selected at least two relations from the relational graph screen.

6. A system of claim 1, wherein the displayed browsing data comprises:
   a story screen showing at least one event of the video story by paragraphs; and
   a section contents screen showing a transition graph linking representative scenes of a section in the video story corresponding to a selected event from the story screen.

7. A system of claim 1, wherein the displayed browsing data comprises:
   a story screen showing at least one event of the video story by paragraphs; and
   a section contents screen showing representative scenes and brief description of a section in the video story corresponding to a selected event from the story screen.

8. The system of claim 1, wherein the displayed browsing data further comprises:
   a story screen showing at least one event of the video story by paragraphs; and
   a section contents screen showing a relational graph of the relations between at least two objects and at least two places of a section in the video story corresponding to a selected event from the story screen, and showing at least one representative scene of a section corresponding to a selected relation from the relational graph.

9. The system of claim 1, wherein the displayed browsing data further comprises:
   a story screen showing at least one event of the video story by paragraphs and a representative scene corresponding to each one of said at least one event; and
   a section contents screen showing a relational graph of the relations between at least two objects and at least two places of a section in the video story corresponding to a selected event from the story screen, and showing at least one representative scene of a section corresponding to a selected relation from the relational graph.

10. The system of claim 1, wherein the displayed browsing data further comprises:
    a story screen showing at least one event of the video story by paragraphs; and
    a section contents screen showing a relational graph of the relations between at least two objects and at least two places of a section in the video story corresponding to a selected event from the story screen, said section contents screen also showing at least one representative scene and brief description of a section corresponding to a selected relation from the relational graph.

11. A system of claim 10, further comprising a display-zoom button indicating a lower class level subordinate to an object or place in the selected relation, if said lower class level exists.

12. The system of claim 11, wherein the section contents screen shows a relational graph of the relations between at least two objects and lower class level places subordinate to said at least two places of a section in the video story corresponding to a selected event from the story screen, if said display-zoom button is selected.

13. The system of claim 11, wherein the section contents screen shows a relational graph of the relations between lower class level objects subordinate to said at least two objects and at least two places of a section in the video story corresponding to a selected event from the story screen, if said display-zoom button is selected.

14. The system of claim 1, further comprising:
    a video buffer configured for the temporary storage of digital video data;
    a video processing unit configured for controlling the digital video data; and
    a control processing unit configured for reading and processing the digital video data.

15. The system of claim 14, further comprising a video supplier terminal configured to develop browsing schemes.

16. The system of claim 15, wherein the video supplier terminal comprises:
    a user interface configured to display video data and to receive user inputs setting main objects and main places, setting relations between said main objects and said main places, setting a representative scene in each section, and adding descriptive notes to said each section;
    a video buffer configured for the temporary storage of digital video data;
    a video processing unit configured for controlling the digital video data;
    a control processing unit configured for editing the digital video data; and
    a memory storing a video story and browsing data based upon a relation between at least one object and at least one place of the video story.

17. A method for developing the data structure for a content-based video story browsing system comprising:
    selecting at least one object and at least one place as factors organizing the contents of a video story and setting the selected objects and places as main objects and places, respectively;
    setting relations between said main objects and said main places, wherein a top level of the data structure initially subdivides and organizes said video story by said relations;
    setting at least one representative scene of a section in the video story corresponding to each set relations;
    setting a composite description for all objects and places in each said section in the video story; and
    storing the set information in a storage to be used in a content-based video story browsing.

18. A method of claim 17, further comprising:
    setting low class levels of objects subordinate to at least one of the set main objects; and
    setting relations between said low class levels of objects and the set main places.

19. A method of claim 17, further comprising:
setting low class levels of places subordinate to at least one of the set main places; and
setting relations between said low class levels of places and the set main objects.

20. A method of claim 17, wherein said representative scene indicates a frame position in the video story.

21. A content-based video story browsing method comprising:
displaying a browsing data based upon relations between at least one object and at least one place of the video story; and
receiving user selections based upon the displayed browsing data, and displaying a section of the video story corresponding to the user selections, wherein displaying the browsing data comprises displaying a story screen showing at least one event of the video story by paragraphs, and wherein receiving user selections comprises displaying a transition graph linking representative scenes of a section in the video story corresponding to a selected event from the story screen.

22. A display of content-based video story browsing system comprising:
a story screen showing at least one event of the video story by paragraph; and
a section contents screen showing a first graphical representation of a section of the video story corresponding to a selected event from the story screen, wherein the first graphical representation comprises at least two objects and at least two places, wherein any of said objects can be selected with any of said places and wherein the first graphical representative is user selectable to display a second graphical representation of the user-selected portion of the first graphical representation.

23. A display of claim 22, wherein the section contents screen shows a transition graph linking representative scenes of the section in the video story corresponding to a selected event from the story screen.

24. A display of claim 22, wherein the section contents screen shows representative scenes and brief description of the section in the video story corresponding to a selected event from the story screen.

25. The display of claim 22, wherein section contents screen shows a relational graph of the relations between at least two objects and at least two places of a section in the video story corresponding to a selected event from the story screen, and show at least one representative scene of a section corresponding to a selected relation from the relational graph.

26. The display of claim 22, wherein the story screen shows a representative scene corresponding to each one of said at least one event, and wherein the section contents screen shows a relational graph of the relations between at least two objects and at least two places of a section in the video story corresponding to a selected event from the story screen, and shows at least one representative scene of a section corresponding to a selected relation from the relational graph.

27. The display of claim 22, further comprising:
a section contents screen showing a relational graph of the relations between at least two objects and at least two places of a section in the video story corresponding to a selected event from the story screen, said section contents screen also showing at least one representative scene and brief description of a section corresponding to a selected relation from the relational graph.

28. A display of claim 27, further comprising a display-zoom button indicating a lower class level subordinate to an object or place in the selected relation, if said lower class level exists.

29. The display of claim 28, wherein the section contents screen shows a relational graph of the relations between at least two objects and lower class level places subordinate to said at least two places of a section in the video story corresponding to a selected event from the story screen if said zoom button is selected.

30. The display of claim 28, wherein the section contents screen shows a relational graph of the relations between lower class level objects subordinate to said at least two objects and at least two places of a section in the video story corresponding to a selected event from the story screen if said zoom button is selected.

31. A display of content-based video story browsing system of claim 22, wherein said video story comprising a textual description for a sequence of events with lineal time relationship.

32. A display of content-based video story browsing system of claim 22, wherein frames of the single video story being viewed have user selectable content.

33. A system for developing the data structure for a content-based video story browsing system comprising:
means for selecting at least one object and at least one place as factors organizing the contents of a video story and setting the selected objects and places as main objects and places, respectively;
means for setting relations between said main objects and said main places, wherein a top level of the data structure initially subdivides and organizes said video story by said relations;
means for setting at least one representative scene of a section in the video story corresponding to each set relations;
means for setting a composite description for all objects and places in each said section in the video story; and
means for storing the set information in a storage to be used in a content-based video story browsing.

34. A video story browsing system comprising:
a memory storing a video story and browsing data based upon relations between at least one object and at least one place of the video story; and
a user interface displaying the browsing data, receiving user selections based upon the displayed browsing data, and displaying a section of the video story corresponding to the user selections, wherein the displayed browsing data comprises:
a story screen showing at least one event of the video story by paragraphs; and
a section contents screen showing a transition graph linking representative scenes of a section in the video story corresponding to a selected event from the story screen.

\* \* \* \* \*

UNITED STATES PATENT AND TRADEMARK OFFICE
CERTIFICATE OF CORRECTION

PATENT NO. : 6,492,998 B1  Page 1 of 1
DATED : December 10, 2002
INVENTOR(S) : Kim et al.

It is certified that error appears in the above-identified patent and that said Letters Patent is hereby corrected as shown below:

<u>Title page,</u>
Item [22], please change the filing date of the application as follows:
Change "[22]   Filed:   April 21, 1999" to
-- [22]   Filed:   January 29, 1999 --

Signed and Sealed this

Twenty-third Day of September, 2003

JAMES E. ROGAN
*Director of the United States Patent and Trademark Office*